United States Patent Office 3,400,184
Patented Sept. 3, 1968

3,400,184
PROCESS AND APPARATUS FOR PREPARING
FILM FROM THERMOPLASTIC RESINS
Ryota Matsuo, Tomoyuki Matsugu, and Teruchika Kanoh,
Yoshiwara-shi, Japan, assignors to Esso Research and
Engineering Company, a corporation of Delaware
Continuation-in-part of application Ser. No. 436,203,
Mar. 1, 1965. This application June 30, 1966, Ser.
No. 564,491
Claims priority, application Japan, Sept. 21, 1964,
39/54,158
24 Claims. (Cl. 264—89)

ABSTRACT OF THE DISCLOSURE

Tubular thermoplastic resin film is formed by (a) extruding downwardly a thermoplastic resin in the form of a tubular film body; (b) preliminarily cooling the film body; (c) passing the film body to a cooling mandrel that is positioned within a cell containing a cooling liquid; (d) expanding the film body and drawing the same over the outer surface of the mandrel whereby the inner surface of the film is cooled through contact with the mandrel and the outer surface of the film is cooled upon contact with the cooling liquid; and (e) thereafter recovering the film.

---

This application is a continuation-in-part of Ser. No. 436,203, filed Mar. 1, 1965, and now abandoned, in the names of Ryota Matsuo, Tomoyuki Matsugu and Teruchika Kanoh.

This invention relates to a process and the apparatus for efficiently preparing films, particularly tubular film, from thermoplastic resins, and specifically for preparing a transparent tubular film with a uniform diameter from a crystalline thermoplastic resin, such as polypropylene.

In general, transparent film can be obtained from crystalline thermoplastic resins, such as polyethylene and polypropylene, by rapidly cooling the molten resin. The process of this invention can be used to prepare a transparent tubular film from any thermoplastic resin.

Preparation of a tubular film by the air-cooled inflation process, usually used for low density polyethylene, cannot be applied to crystalline polypropylene, because the melt extruded through a ring die is cooled so slowly that relatively large spherulites are likely to be formed in the film, giving a less transparent film.

A process has been proposed whereby a highly transparent film is obtained by rapidly cooling the tubular film extruded through the ring die with a liquid from the outside and inside of the film; however, the inside of the tube cannot be dried successfully.

A process has also been proposed, similar to that used in preparing tubular films from poly(vinylidene chloride), in which the tubular film is cooled by a cooling liquid surrounding the outer surface thereof. Compressed air is blown out from a perforated cylinder installed inside the tubular film at a pressure equal to the liquid pressure and is exhausted through an outlet. This process may be useful in cooling the film from the outside while maintaining the shape of the tubular film, but it is not in commercial practice because it is difficult to control the balance between introduced and exhausted air, and, in addition, the relatively high internal air pressure (equal to the liquid pressure) often breaks the molten tubular film positioned immediately beneath the die.

Another proposal involved cooling the tubular film only from the outer surface thereof, by means of a waterfall-like stream applied all around the tubular film. Unfortunately, a waterfall-like cylinder of water is difficult to maintain and the temperature thereof tends to increase upon passage over the film body so that in most cases irregular cooling effects result and the physical properties of the film, such as transparency and impact resistance, are often reduced to an undesirable degree. This is particularly true in the case of water-repellent thermoplastic resins such as polypropylene and polyethylene.

The present invention eliminates all of the difficulties previously encountered and provides a process and apparatus for efficiently producing film, particularly tubular film, from thermoplastic resin. In particular, the present invention provides a novel and advantageous process and apparatus for continuously and reproducibly producing transparent film, particularly tubular film, of uniform diameter from a crystalline thermoplastic resin, such as polypropylene.

According to the present process, a molten film of a thermoplastic resin is charged from an extrusion machine and passed generally downwardly between a vertically disposed film support member and a fixed body or bath of cooling liquid. The film support member makes up one wall of the enclosure for the cooling liquid and the molten film is maintained in contact with at least a portion of the film support member by the pressure of the cooling liquid exerted against the film. Thereafter, the finished film is recovered by passing the film through an enclosure positioned adjacent to the film support member in the bottom of the cooling bath enclosure.

In the case of tubular film production, a molten substantially tubular film body of thermoplastic resin is cooled by causing it to slide over a cylindrical cooling mandrel that is positioned in a fixed body or bath of cooling liquid. The outside surface of the tubular film is cooled through contact with the cooling liquid and the inside surface of the film is cooled through at least partial contact with the cooling mandrel while the film slides thereon. Preferably, the molten tubular film is partially cooled and simultaneously expanded prior to passage over the mandrel by means of a cooling gas, e.g. air or nitrogen, blown against the film from the inside or outside or both. The air blown from within the tubular film is desirably directed upwardly against the film in the zone where the film contacts the mandrel. However, the cooling gas may be directed both upwardly and downwardly against the downwardly forwarded inside surface of the film. When the tubular film leaves the cooling mandrel, it is convenient to cause it to pass through an elastic enclosure at the bottom of the tank containing the liquid bath in order to facilitate removal of the film from the bath without excessive leakage.

In the following discussion, the present invention, including both process and apparatus features, will be described with reference to polypropylene as an example of a suitable thermoplastic resin.

Crystalline polypropylene is melted in the ordinary way in an extruder and extruded in a downward direction through a ring die. The molten tubular film is subjected to preliminary cooling with a forced cooling gas such as air to partially rigidify the film. Desirably, the preliminary cooling is effected with air blown over the outside of the film by means of an air-ring placed immediately below the ring die in addition to air blown inside the tubular film. The compressed cooling gas blown inside the tubular film serves not only to cool the film but also to simultaneously expand it to a diameter slightly larger than that of the mandrel.

The preliminary cooling is an important factor in obtaining a stabilized tubular film when the film is expanded from 1.0 to 3 times as large a diameter as that of the ring die slit. If the preliminary cooling is omitted, a tubular film can still be formed, but with less perfect sectional symmetry and with less uniform diameter. Preliminary cooling is also desirable in order to avoid momentary adhesion of relatively hot film to the mandrel. Such adhesion is obviously undesirable and may be minimized or avoided by preliminary cooling to make the film more rigid.

In commercial operations wherein a highly transparent film product is sought, it is necessary that the film body be preliminarily cooled with the cooling gas to an extent that maximum polymer viscosity is achieved without the occurrence of a "frost line" on the film prior to the film contacting the cooling liquid in the bath surrounding the mandrel. Typically, polypropylene films should be at about 375–400° F. and polyethylene films at 300–325° F. immediately prior to contact with the cooling bath.

In a preferred embodiment, a light projector is placed immediately after the air-ring and is caused to throw a light beam across the surface of the film. Variations in intensity of the light due to the passage of the film body through the path of the light beam is sensed by a photoelectric element and the signal from the photocell, after passing through an amplifier, operates an electromagnetic valve controlling the amount of compressed cooling gas blown into the tubular film. In this manner, the film is brought in contact with the surface of the mandrel at a predetermined position, because the diameter of the tubular film is maintained at a predetermined value.

The ring die is connected to the cooling mandrel and is desirably equipped with means to transfer heat exchanging cooling liquid to and from the interior of the cooling mandrel, means to supply compressed cooling gas to the inside of the film to cool and make the molten tubular film expand to a predetermined diameter before it reaches the mandrel, and means to supply compressed gas to the inside of the tubular film when the film is between the mandrel and the pinch-rolls.

In a preferred embodiment of the invention, cooling liquid flows through the ring die into the mandrel and is discharged. Passage of the cooling liquid through the mandrel keeps the wall of the mandrel cooled. In most cases, however, the cooling mandrel need not be internally cooled by means of circulating liquid, since the major part of the wall of the mandrel is cooled indirectly by the bath of cooling liquid surrounding the tubular film. Generally, it is sufficient merely to agitate the liquid inside the mandrel with bubbled air or a stirrer. The same or different cooling liquid can be used inside the mandrel and in the bath of the cooling liquid, but the cooling liquid must not dissolve or corrode the film or the mandrel. Ordinarily, water can be used most conveniently.

From extensive investigation it was found that the temperature of the cooling liquids, both outside and inside the mandrel, is preferably maintained below 45° C. when processing polypropylene. Also it is desirable for a smooth operation to keep the level of the cooling liquid in the bath slightly above the zone of initial contact of the film with the mandrel. When the level of the outer cooling liquid is kept less than 5 mm. higher than the zone where the inside of the film first contacts the mandrel, the inside of the film is at a relatively high temperature because the film has been insufficiently cooled before the contact zone is reached, and it is likely that the inside of the film will adhere to the mandrel. On the other hand, when the level of the liquid is raised more than 35 mm. above the contact zone, the excessive water pressure presses the tubular film against the upper part of the mandrel, thereby causing the film to wrinkle which tends to keep the film from sliding on the mandrel.

By keeping the cooling liquids, outside and inside the mandrel, below 45° C. when processing polypropylene, and at the same time maintaining the level of the bath of cooling liquid 5 to 35 mm. above the contact zone, a tubular film with good transparency is obtained.

In general, when a cooling mandrel is employed in manufacturing tubular film from thermoplastic resins, decomposition products of the resins, volatile or decomposed products initially present as resin components, such as thermal stabilizers, slipping agents and ultraviolet absorbers, may condense on the cooling mandrel as a liquid or solid, which will not only cause opaque spots to be formed on the film, but also may disturb smooth operation. This is markedly observed when the condensation occurs close at the zone of initial contact of the film with the mandrel.

In the process of this invention, compressed cooling gas (e.g. air) is blown against the inside of the film at or near the contact zone in horizontal, upward, or downward directions, or in a combination of these directions, not only to expand and partially rigidify the film, but also to prevent the volatile or decomposed matters of the resins from condensing at the contact zone. Combined use of upward and downward streams reduces the amount of condensed products which condense close to the contact zone. As an additional effect, a downward stream puts a layer of air between the film and the mandrel, which acts as an air cushion when the winding speed is increased.

Thereafter, the tubular film is passed through an elastic seal positioned at the lower juncture of the cooling mandrel, which makes up one wall of the vessel containing the cooling liquid, and the main body of the liquid cell cooling means. Since leakage of liquid from the bottom of the liquid cell or tank is substantially prevented by the liquid seal, the tubular film leaving the cooling mandrel is not accompanied by appreciable amounts of liquid.

After the tubular film leaves the mandrel and before it reaches the pinch-rolls, it may be optionally expanded with a constant pressure of inside air supplied from a pipe penetrating the mandrel. The film can be kept expanded with a constant pressure of inside air supplied from a pipe penetrating the mandrel. The film can be kept expanded with a film expander, attached to the bottom of the mandrel, in the form of an elastic steel wire covered with plastic. The expanded film then reaches the pinch-roll, where it is folded without wrinkling.

During the winding-up of the film, there is no danger of formation of nip wrinkles even when a wide and thin tubular film is produced, because the nip roll is positioned exterior to the outer cooling liquid tank.

An example of the apparatus employed in the process of this invention will be explained with particular reference to the drawing in which.

An example of the ring die is shown in FIGURES 1 to 5. Hollow torpedo 1 is located in a spider-type die 2, and a ring slit 3 is formed between the torpedo 1 and the die 2. Molten polypropylene resin 4 is extruded from the film oulet 5 at the lower end of the ring slit, forming a molten tubular film 6. Heater 7 outside the die 2 is used to maintain the die at an elevated temperature.

A centerpiece 9 is inserted and installed in the hollow part of torpedo 1 along the longitudinal axis of the torpedo 1 leaving a narrow gap 8 between torpedo 1 and centerpiece 9. The cooling mandrel 10 is connected to the centerpiece 9.

The centerpiece 9 is provided with: a liquid inlet 11 and an outlet 12 for circulation of cooling liquid in the cooling mandrel 10; a cooling gas inlet 13 to introduce air, nitrogen, etc., inside the tubular film 6 in the area between the die 2 and the mandrel 10; and cooling gas inlet 14 through which gas is supplied inside the tubular film in the area between the mandrel 10 and pinch-rolls 28 located below the mandrel (see FIGURES 9 and 11).

The inlets 11, 13 and 14 and outlet 12 are connected to pipes 11', 12', 13' and 14', respectively, which penetrate the slit 8, the torpedo 1 and the die 2 and which extend to the outside of the die 2.

The centerpiece 9 is fixed to the torpedo 1 at the brim 15 of the torpedo, and arcuate openings 17 for exhaust cooling gas are provided at equal intervals on the circumference of the brim 15.

Thus the air or other cooling gas introduced inside the tubular film between the torpedo 1 and the mandrel 10 may also be exhausted through the openings 17, slit 8 and the opening 8' out of the die.

The rate with which the liquid and the cooling gas are introduced and exhausted to and from inlets 11, 13 and 14 and outlet 12 can be controlled from outside the die by conventional means (not shown).

The surface of the centerpiece 9 may be covered with a thermal insulator 18, if necessary, to avoid having a large amount of condensed matter adhere to the wall of the cooled centerpiece.

Figure 6:
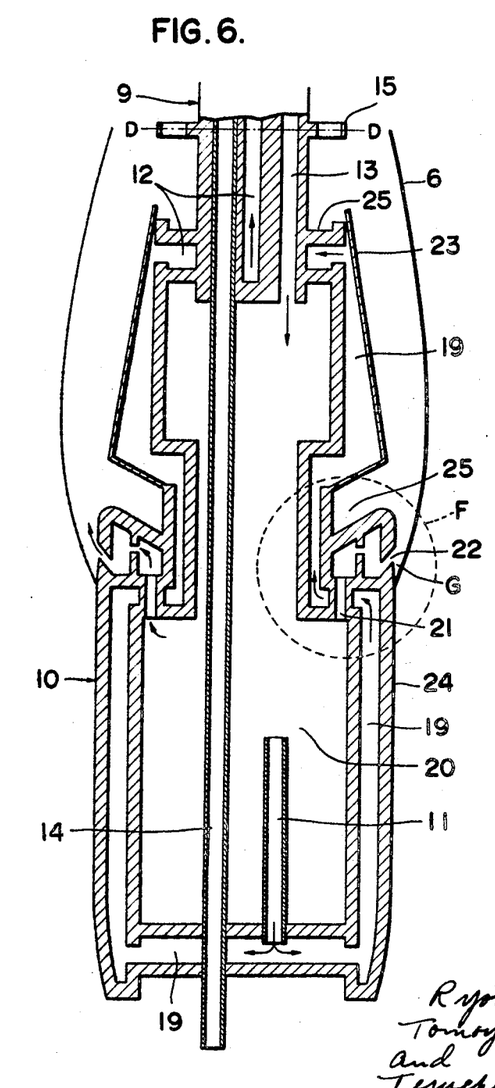
FIGURE 6 is a vertical section of the centerpiece and the cooling mandrel.
Figure 7:
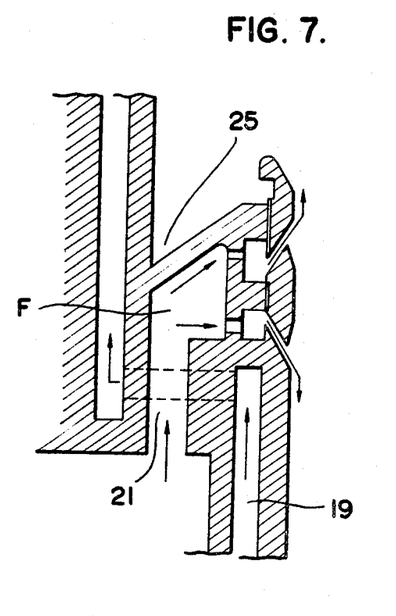
FIGURE 7 is an enlarged embodiment of F in FIGURE 6.
Figure 8:
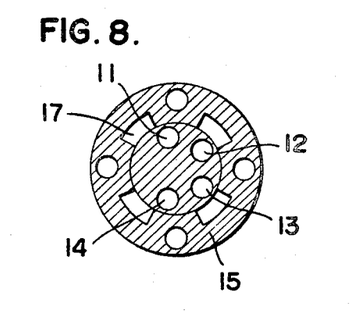
FIGURE 8 is a section on lines DD of FIGURE 6.
Figure 14:
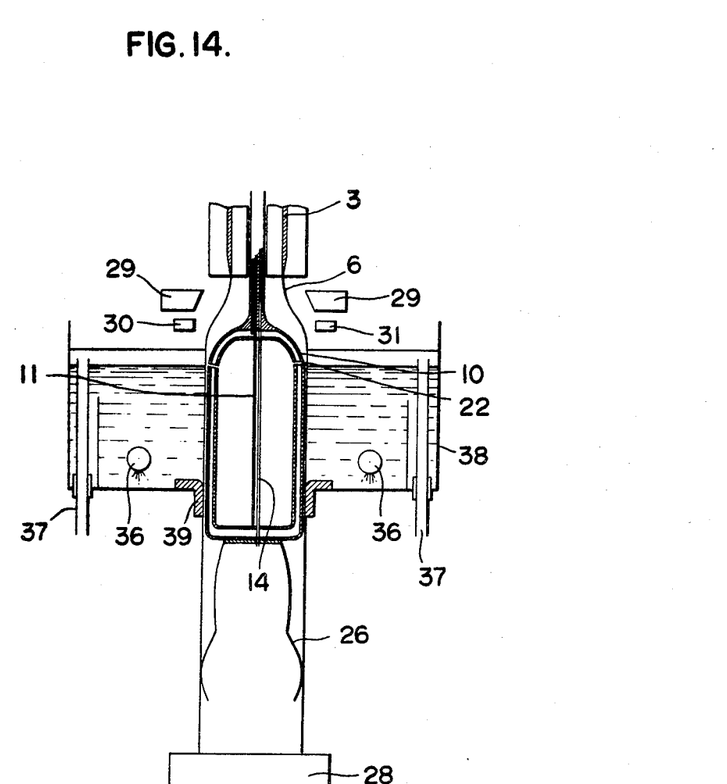

Typical examples of the cooling mandrel 10 are shown in FIGURES 6 to 8. The side and the bottom of the mandrel are made with double walls enclosing an outer chamber 19. The cooling liquid flows in outer chamber 19 and compressed cooling gas flows inside inner chamber 20. The inlets 11 and 14 for the cooling liquid and gas, respectively, penetrate inner chamber 20. The lower end of liquid inlet 11 opens into outer chamber 19 at the bottom of the mandrel 10 and the lower end of air inlet 14 opens at the bottom of the mandrel in order to supply cooling gas to the inside of the tubular film between the mandrel and the pinch-rolls (FIGURE 14).

Compressed cooling gas is introduced, as the arrows indicate, through the gas inlet 13, into inner chamber 20, through the pipe 21 and the structure F, and out at the slit 22.

Figure 1:
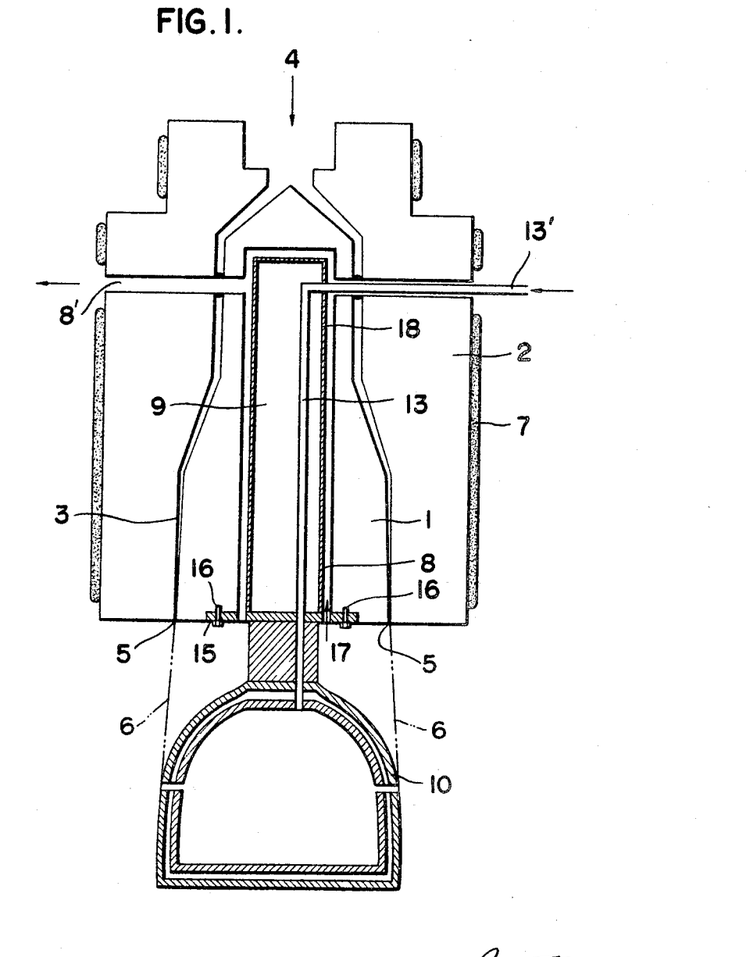
FIGURE 1 shows a vertical section of the die and FIGURE 2 another vertical section perpendicular to that of FIGURE 1.
Figure 2:
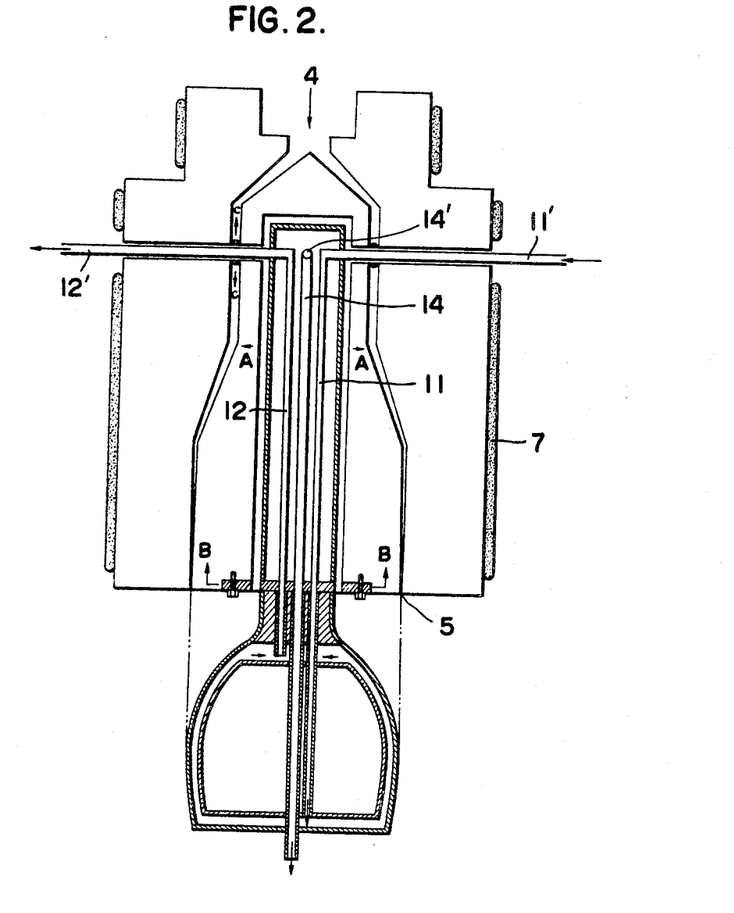
Figure 3:
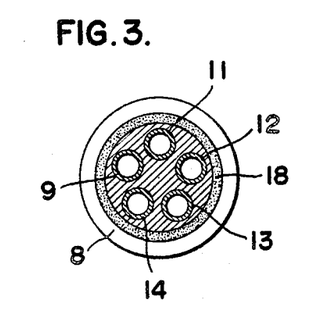
FIGURES 3, 4 and 5 are sections on lines AA, BB and CC, respectively, shown in FIGURE 2.
Figures 4, 5:
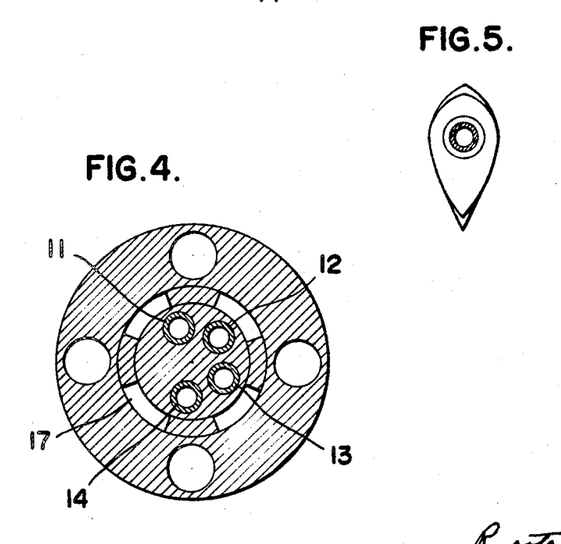

Cooling liquid is introduced, via the liquid inlet 11, into the inner chamber 19 at the bottom of the mandrel, rises in the inner chamber 19 up to the shoulder 23 of the mandrel, and is discharged through the liquid outlet 12. The cooling mandrel 10 is a combination of an upward tapered shoulder 23 and a cylinder 24. The slit 22 for compressed gas blow-out is situated immediately above that portion of the cylinder 24 where the molten tubular film from the die is first brought into contact with the mandrel. The gas blown out from the slit 22 into the tubular film 6 goes through the exhaust hole 17 in the brim 15, into the aperture 8 between the centerpiece 9 and the torpedo 1, and is then discharged to the outside (FIGURES 1 and 8).

Pooling cavities 25 may be set up for collecting condensed matters forming above the shoulder 23 and the compressed gas blow-out slit 22.

Figure 9:
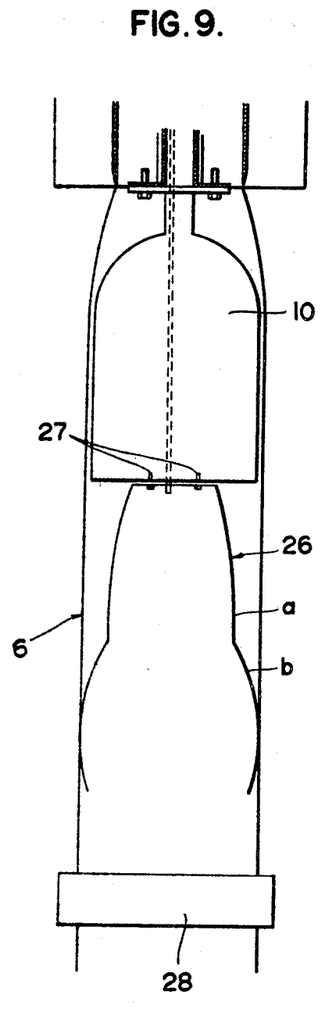
FIGURES 9 and 10 are front views of the film expander.
Figure 10:
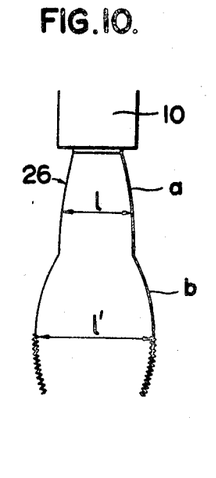

An example of the film expander is shown in FIGURES 9 and 10. The expander 26 is installed by means of fasteners 27 to the bottom of the mandrel 10 and consists of a U-shaped elastic steel wire (e.g., piano wire) extending symmetrically along the center axis of the mandrel 10 with each lower end free.

Expander 26 is shaped such that the interval $l$ between the two branches of the wire at part $a$ is smaller than the diameter of the mandrel, whereas the interval $l$ gradually increases downwardly of part $b$ to reach a maximum, at the portion contacting the film, larger than the diameter of the mandrel 10.

Cooling gas is blown into the tubular film to expand the film after the film leaves the cooling mandrel by means of inlet 14. The tubular film 6 is kept in an expanded state between the cooling mandrel 10 and the pinch-rolls 28 by the expander 26, and consequently the film can be pinched without forming wrinkles. To avoid having the inside of the film marred by the expander 26, the steel wire, at least at the portion of part $b$ where the wire contacts the film, is covered with wood or a smooth tube or thin film made from an elastic material having a small coefficient of friction with respect to the film.

The whole of the expander 26 is not necessarily made from an elastic wire. Thus, a plate or any other shape and material may be used for the part $a$, inasmuch as it merely supports part $b$.

Figure 11:
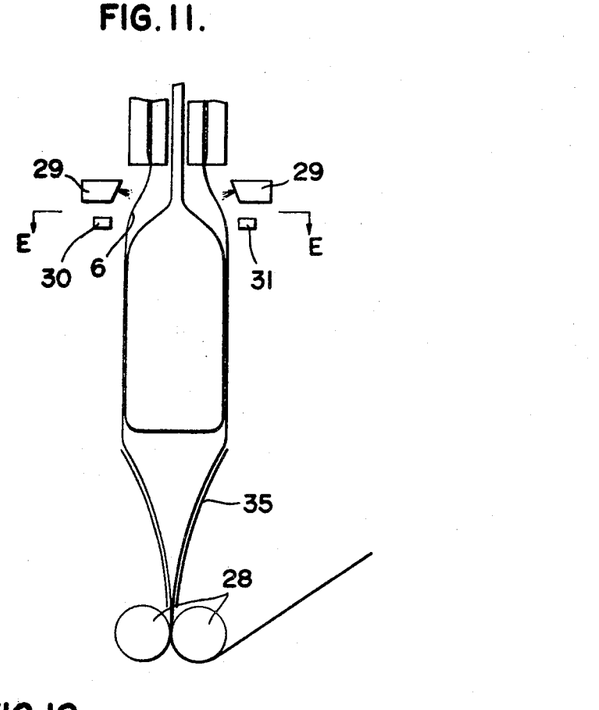
FIGURE 11 shows an example of the apparatus of this invention in a vertical section.
Figure 12:
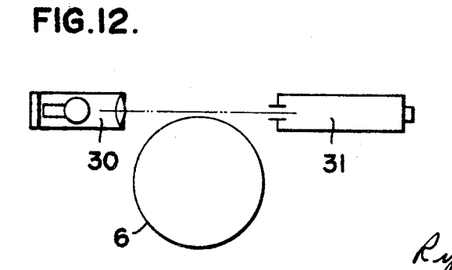
FIGURE 12 is a section on lines EE shown in FIGURE 11.
Figure 13:
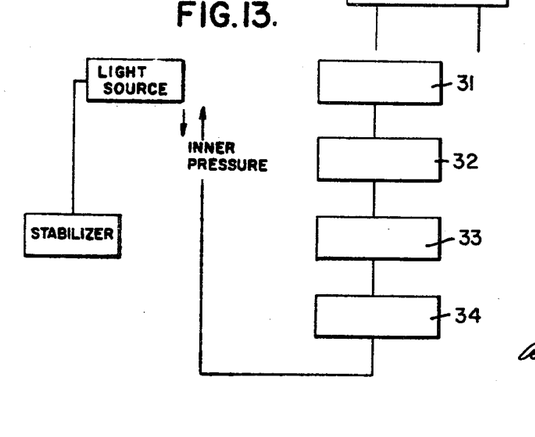
FIGURE 13 is a block diagram indicating the mechanism to control the diameter of the molten tubular film. Another example of the apparatus for carrying out this invention is shown in FIGURE 14 in a vertical section.

FIGURES 11 to 13 illustrate the means provided to adjust and maintain the diameter of the tubular film 6 at the desired value. A light projector 30 and a photocell 31 are placed on either side of, and in a plane tangent to, a horizontal section of the tubular film 6. Above projector 30 and photocell 31 is an air ring 29, which is used to cool the molten film 6 with compressed air. The projector 30 is operated to throw parallel light beams having a constant width and constant intensity within a horizontal plane tangent to the film surface in such a manner that at least one light beam passes with its center line tangent to the film 6. Variations of the light intensity caused by irregular and/or spherical reflections occasioned by the film body passing through the light beam are sensed by the photocell 31, which feeds a signal to a meter relay 32 and a control circuit 33, which operates an electromagnetic valve 34 to adjust the aperture of the compressed cooling gas inlet 13. Thus, the pressure of the cooling gas introduced inside the downwardly forwarded tubular film 6 is controlled and made responsive to variations in film tube diameter prior to contact with the cooling mandrel so as to maintain the diameter of the film at a constant value such that the center line of the light beam is always tangent to the outer surface of the film. V-shaped guide panels 35 aid in feeding the film 6 to the pinch-rolls 28.

Projector 30 and photocell 31 are set to maintain the diameter of the tubular film slightly larger than the outer diameter of the mandrel 10. This ensures that the film will slide down the mandrel, which increases the cooling efficiency of the mandrel, improves the transparency of the film and helps efficiently to produce a wrinkle-free tubular film of constant diameter.

The tubular film 6 is cooled from inside by the cooling mandrel 10 and is directly cooled from outside by the liquid in the cooling tank 38 in which the tubular fifilm is immersed (see FIGURE 14).

As shown in FIGURE 14, the outside surface of the tubular film body 6 is cooled through contact with a cooling gas exhausted through ring 29. The blowing angle used is preferably approximately 20° to the perpendicular and the cooling gas, e.g., air, exhausted serves to partially rigidify the tubular film body 6 and also acts as a stabilizing media by girdling the outside of the molten tubular film body with a column of cooling gas. The cooling liquid used in the final cooling of the outside surface of the tubular film body flows into tank 38 through an inlet pipe 36 and is discharged by overflowing through a vertically movable pipe 37. The liquid in tank 38 is maintained at a constant level.

A hole is provided at the bottom of cooling tank or cell 38 having a diameter larger, e.g., 10 mm. larger, than that of the mandrel which forms one wall of the cell. The gap between the hole and the tubular film is loosely packed with a soft elastic material 39, such as gum sponge, which prevents substantial leakage of the cooling liquid from the tank and assures that the tubular film will move smoothly downward while sliding on the surfaces of the mandrel and the elastic body 39.

The process of this invention, which is especially useful in producing transparent tubular films of crystalline polypropylene resin, can also be utilized in producing tubular films of any film-forming thermoplastic resins such as for example, other alpha-olefin polymers, e.g., polyethylene and ethylene-propylene copolymers, poly(vinylidene chloride) and polyesters.

An example of this invention will be explained as follows, which of course shall not be limiting.

Crystalline polypropylene (96% isotactic) having a melt index of 4.0 (as measured at 230° C. and under a load of 216 kg. following ASTM D-1238-57T), was extruded from the ring die of an extruder at 250° C. into a tubular form. The diameter of the slit in the ring die was 75 mm. and the aperture of the slit was 0.4 mm.

The molten tubular film was expanded to 150 mm. inner diameter with compressed air blown out between the die and the cooling mandrel, and was cooled from the outside by blowing air at 20° C. against the film from an air ring located directly below the die.

The diameter of the tubular film was maintained at slightly larger than 150 mm. by adjusting the inner air pressure. The adjustment was operated in the following manner: a light beam from a 6 v., 8 w. source passing through a convex lens of 20 mm. focal length was applied tangentially to the surface of the film, and the variations in intensity of the light were sensed with a cadmium sulfide photoelectric element. The output of the photoelectric element was led to a meter-relay operating an electromagnetic valve for adjustment of the inner air pressure. The tubular film was then introduced into a water tank, the level of water being 140 mm. below the lower end of the die, and directly cooled from outside. At the same time the film was cooled from inside while sliding on a 150 mm. outer diameter mandrel attached to the bottom of the die. The mandrel was kept at a fixed temperature of 22° C. by means of water constantly circulating into and out of the mandrel. Compressed air was blown out, to expand the molten tubular film, both upward and downward, from a slit on the mandrel located near the zone of initial contact of the film with the mandrel, as is illustrated in FIGURE 7.

The temperature of the cooling water in the water tank was 20° C. The level in the tank was adjusted to be 10 mm. above the zone of initial contact of the film with the mandrel. After leaving the mandrel, the tubular film was maintained in expanded form by means of a mechanical film expander and a controlled flow of compressed air. The film was then guided in an expanded form to the pinch-rolls, where it was folded without wrinkles and passed to take-up rollers.

The film-forming operation proceeded smoothly. The tubular film obtained was 0.03 mm. thick and had a transmittance of visible light of 90% (relative to the transmittance of the same thickness of air being 100%). The film was also excellently transparent by visual observation, was dry on each side and was completely free from wrinkles.

When the temperature of the water inside the mandrel and in the water tank was raised to 50° C., the inner surface of the tubular film frequently adhered to the surface of the mandrel. This not only disturbed smooth operation of the process, but it also left opaque circular spots of about 10 mm. diameter on the film. In addition, the transmittance of visible light was only 78% for the part not adhered to the mandrel.

When the level of the outside cooling water was lowered to 4 mm. above the zone of initial contact of the film with the mandrel, the same adhesion of the film to the mandrel occurred as was observed when the temperature of the water was raised to 50° C. When the level of the water was raised up to more than 35 mm. above the contact zone, the water pressure pressed the film against the upper part of the mandrel and the film could not slide on the mandrel.

If the blow-out slit 22 for compressed air to be introduced inside the tubular film was located on the die or between the die and the shoulder of the mandrel, instead of near the zone of initial contact of the film with the mandrel, volatile matters and resin and additive decomposition products condensed not only on the shoulder of the mandrel but also around the contact zone, which disturbed smooth operation of the process.

As explicity shown in the above example, this invention provides a process for preparing tubular film from crystalline polypropylene resin. The final product is highly transparent, dry on both outer and inner surfaces and perfectly free from wrinkles and blockings.

What is claimed is:

1. A process for the formation of tubular thermoplastic film comprising:
    (a) extruding a thermoplastic resin generally downwardly in the form of a molten thermoplastic substantially tubular film body;
    (b) downwardly passing said film body to a cooling mandrel, said mandrel positioned in a cell containing a cooling liquid;
    (c) directing a cooling gas upwardly through an inside portion of said downwardly forwarded film body prior to contact with said mandrel thereby partially cooling and simultaneously expanding said film body to a diameter larger than the diameter of said mandrel and preventing the condensation of thermoplastic resin decomposition products on said mandrel at the point where the film contacts said mandrel;
    (d) sliding the inside surface of said partially cooled, expanded tubular film body downwardly over the outer surface of said cooling mandrel whereby the inside surface of said tubular film is maintained in contact with at least a portion of said mandrel by pressure exerted by the cell cooling liquid and is cooled through contact with said mandrel and the outer surface of said film body is cooled through contact with the cooling liquid in said cell; and
    (e) thereafter recovering said tubular film.

2. The process of claim 1 wherein said downwardly forwarded film body is contacted with the cooling liquid contained in said cell prior to contact with said mandrel.

3. The process of claim 1 wherein the outside surface of said tubular film body is preliminarily cooled by passing air over the outside surface of the film body.

4. The process of claim 1 wherein said gas is passed continuously upwardly through the inside portion of said downwardly moving tubular film body.

5. The process of claim 4 wherein said gas is air.

6. The process of claim 4 wherein the pressure of said gas passing upwardly through said tubular film is responsive to variations of the diameter of said tubular film prior to contact with said mandrel.

7. The process of claim 1 wherein the outside surface of said tubular film body is preliminarily cooled prior to contact with the mandrel by passing a cooling gas downwardly over the outside surface of the tubular film body.

8. The process of claim 7 wherein said thermoplastic resin is polyethylene.

9. The process of claim 7 wherein the gas passed upwardly through the inside portion of said downwardly forwarded film body is passed from the upper portion of the cooling mandrel at a point immediately above the point where the downwardly forwarded film first contacts the cooling mandrel.

10. The process of claim 7 wherein said thermoplastic resin is polypropylene.

11. The process of claim 10 wherein said cooling mandrel is maintained at a temperature of below about 45° C. by passing a heat exchanging cooling liquid through said mandrel.

12. The process of claim 10 wherein the temperature of said cooling mandrel and cooling liquid is maintained below about 45° C.

13. A process for the formation of tubular thermoplastic film comprising:
    (a) extruding a thermoplastic resin selected from the group consisting of polyethylene and polypropylene generally downwardly in the form of a molten thermoplastic substantially tubular film body;

(b) downwardly passing the said film body to a cooling mandrel, said mandrel positioned in a cell containing water;

(c) directing air upwardly through an inside portion of said downwardly forwarded film body prior to contact with said mandrel thereby partially cooling and simultaneously expanding said film body to a diameter larger than the diameter of said mandrel and preventing the condensation of thermoplastic resin decomposition products on said mandrel at the point where the film contacts said mandrel;

(d) passing air downwardly over the outside surface of said downwardly forwarded tubular film body;

(e) sliding the inside surface of said partially cooled, expanded tubular film body downwardly over the outer surface of said cooling mandrel whereby the inside surface of said tubular film is maintained in contact with at least a portion of said mandrel by the pressure exerted by the water contained in the cell and is cooled through contact with said mandrel and the outer surface of said film is cooled through contact with the water in the cell; and (f) thereafter recovering said tubular film.

14. The process of claim 13 wherein the air directed upwardly through an inside portion of said film body is introduced from said mandrel at a point immediately above the point where the film is first brought in contact with said mandrel.

15. The process of claim 14 wherein said downwardly forwarded film body is contacted with the water contained in said cell prior to contact with said mandrel.

16. The process of claim 15 wherein the water in said cell is maintained at a level from 5 to 35 millimeters above the point where said film body first contacts said mandrel.

17. Apparatus for manufacturing tubular film from thermoplastic film forming materials which comprises, in cooperating combination:

(a) means for extruding generally downwardly a molten tubular film body;

(b) a cooling mandrel and cell for containing cooling liquid, said cooling mandrel positioned within said cell, and said mandrel and cell positioned beneath said extruding means;

(c) means for forwarding said tubular film downwardly over the outer surface of said cooling mandrel; and (d) means for directing a cooling gas upwardly through an inside portion of said downwardly forwarded film body prior to passage of said film body over said mandrel thereby partially cooling and simultaneously expanding said film body to a diameter larger than the diameter of said mandrel and preventing the condensation of thermoplastic resin decomposition products on said mandrel at the point where the film contacts said mandrel.

18. The apparatus of claim 17 wherein said mandrel has a cylindrical configuration.

19. The apparatus of claim 17 including means for preliminarily cooling the outside surface of said tubular film prior to forwarding said film to said mandrel.

20. The apparatus of claim 19 wherein said means for preliminarily cooling the outside surface of the tubular film is an air ring positioned immediately below said extrusion means.

21. The apparatus of claim 19 including sensing means for monitoring the diameter of said tubular film passing from said extrusion means and prior to contact with said cooling mandrel and means responsive to said sensing means for controlling pressure of the gas passing upwardly through the inside of said tubular film body.

22. The apparatus of claim 21 wherein said cooling mandrel is provided with heat exchanging cooling means.

23. Apparatus for manufacturing tubular film from thermoplastic film forming materials which comprises, in cooperating combination:

(a) means for extruding generally downwardly a molten tubular film body;

(b) a cooling mandrel and cell for containing cooling liquid, said cooling mandrel positioned within said cell and said mandrel and cell positioned beneath said extruding means;

(c) means for directing a cooling gas over the outside surface of said tubular film said means positioned between said extruding means and said cooling mandrel and cell;

(d) means for forwarding said tubular film downwardly over the outer surface of said cooling mandrel; and (e) means for directing air upwardly through an inside portion of said downwardly forwarded film body prior to passage of said film body over said mandrel thereby partially cooling and simultaneously expanding said tubular film body to a diameter larger than the diameter of said mandrel and preventing the condensation of thermoplastic resin decomposition products on said mandrel at the point where the film contacts said mandrel.

24. Apparatus of claim 23 wherein said means for directing a cooling gas through an inside portion of said film body is located on said mandrel and is positioned at a point immediately above the point where the film is first brought into contact with said mandrel.

References Cited

UNITED STATES PATENTS

| | | | |
|---|---|---|---|
| 2,955,321 | 10/1960 | Fortner et al. | 264—95 |
| 3,084,386 | 4/1963 | Gerow | 264—210 X |
| 3,090,998 | 5/1963 | Heisterkamp et al. | 264—95 |
| 2,863,172 | 12/1958 | Buteux et al. | 18—14 |
| 3,092,874 | 6/1963 | Fallwill | 264—95 X |
| 3,142,092 | 7/1964 | Ralston | 18—14 |
| 3,193,547 | 7/1965 | Schott | 264—209 |
| 2,433,937 | 1/1948 | Tornberg | 18—14 |
| 3,294,882 | 12/1966 | Lutzmann et al. | 264—95 |

FOREIGN PATENTS

| | | |
|---|---|---|
| 842,064 | 7/1960 | Great Britain. |
| 903,661 | 8/1962 | Great Britain. |

ROBERT F. WHITE, *Primary Examiner.*

A. R. NOË, *Assistant Examiner.*